United States Patent [19]
Takashina et al.

[11] 4,439,560
[45] Mar. 27, 1984

[54] COATING COMPOSITION

[75] Inventors: Naomitsu Takashina, Yokohama; Masahiro Shimoi, Hiratsuka; Yoshinori Iwamoto, Odawara, all of Japan

[73] Assignee: Mitsubishi Gas Chemical Company, Inc., Tokyo, Japan

[21] Appl. No.: 294,800

[22] Filed: Aug. 20, 1981

[30] Foreign Application Priority Data

Aug. 22, 1980 [JP] Japan .................................. 55/115492

[51] Int. Cl.$^3$ ................................................ C08K 5/05
[52] U.S. Cl. ..................................... 523/437; 523/448; 523/456; 525/327.3; 525/340
[58] Field of Search ............................ 525/340, 327.3; 260/17 R, 33.4 R; 523/456, 437, 448

[56] References Cited

U.S. PATENT DOCUMENTS 2,710,844  6/1955  Thompson ........................... 523/448
4,181,642  1/1980  Holle et al. ........................ 525/327.3
4,287,113  9/1981  Takashina et al. ........... 260/33.4 EP

*Primary Examiner*—Joseph L. Schofer
*Assistant Examiner*—N. Sarofim
*Attorney, Agent, or Firm*—Armstrong, Nikaido, Marmelstein & Kubovcik

[57] ABSTRACT

An ambient temperature curing, two-package type coating composition consists essentially of a solution of (1) components reactive with each other to form a film upon curing at ambient temperature and (2) a solvent; said film-forming components (1) being (a) copolymer having pendant epoxy groups prepared by copolymerization of 2 to 60% by weight, on the basis of total monomer, of glycidyl acrylate or methacrylate or allylglycidyl ether with at least one other polymerizable monomer, and (b) 0.1 to 3.0 equivalents of at least one of acid phosphate esters or acid phosphite esters, and said solvent (2) being (c) at least 5% by weight, on the basis of the solvent (2), of an alcoholic solvent, and (d) at least one other organic solvent. The coating composition has a good pot life when mixed into an ultimate single mixture, and the resulting coating film has a good resistance to water.

5 Claims, No Drawings

COATING COMPOSITION

The present invention relates to a two-package type coating composition that forms a cross-linked film insoluble in an organic solvent at the ambient temperature, and more particularly to a two-package type composition which comprises (1) a solution of ethylenic copolymers having pendant epoxy groups, and (2) acid phosphate esters or acid phosphite esters and an alcoholic solvent. The present composition has sufficient pot life and stability for coating when said (1) and (2) are mixed together, and can form a film of cross-linked structure with good physical properties readily at the ambient temperature when applied.

It is known to modify copolymers having pendant epoxy groups with phosphoric acid. For example, U.S. Pat. No. 2,723,971 discloses that more than an equivalent amount of 85% phosphoric acid is made to react with the epoxy groups to esterify the epoxy groups by phosphoric acid, and then the resulting esters are separated as polyphosphates by a non-solvent, purified by removing excess phosphoric acid therefrom, and dissolved in dilute alkali or, dilute ammonia, or the like, or said polyphosphates are dissolved in an organic solvent, and the resulting solution is used for coating, sizing for fibers, or treating for leather. J. Appl. Polymer Sci. 5 (1358–68 (1961) reports an effect of ketone solvent in treating a composition of polymers having epoxy groups at side chains with phosphoric acid. It discloses that the so-called ketal type polymer, formed by the reaction of phosphoric acid with copolymers having epoxy groups at side chains in an excess of ketone solvent can be used as one-package type coating composition, which gives a crosslinked film with reasonable properties only when baked at a temperature of higher than 100°C.

On the other hand, U.S. Pat. No. 3,454,418 discloses metal coating compositions prepared from a polymeric polyol and epoxy resin, phosphoric acid, a phosphoric acid-epoxy-metal base reaction product and a solid thermosetting phenolaldehyde resin, where the coating compositions are stated to impart improved detergent resistance to metals when applied thereto and baked at a metal temperature of at least about 250°C. However, the prior art compositions cannot cure at ambient temperatures.

The present inventors previously found an ambient temperature-curing coating composition which is a solution comprising, as film-forming components, copolymers having pendant epoxy groups and phosphoric acid and, as a solvent, an alcoholic solvent and at least one other organic solvent (U.S. Patent Application Ser. No. 102,920 filed Dec. 12, 1979), now U.S. Pat. No. 4,287,113.

As a result of further study of the ambient temperature-curing coating composition, the present inventors have found that higher resistances to lukewarm water and boiling water can be obtained by a coating composition comprising the ethylenic copolymer having pendant epoxy groups and acid phosphate esters or acid phosphite ester than by the composition containing phosphoric acid or condensed phosphoric acid previously found by the present inventors, and have established the present invention.

According to the present invention, the two-package coating composition comprises two solutions, i.e. a solution of ethylenic copolymers having pendant epoxy groups, and a solution of acid phosphate esters or acid phosphite esters in an alcoholic solvent, and the two solutions are mixed together when applied. It is necessary that at least 5% by weight of the alcoholic solvent is contained, on the basis of the total solvents, in the ultimate mixed solution, even if diluted with a thinner when required. The composition thus mixed together in the ultimate solution can have a long pot life such as one week or longer at ambient temperatures without any increase in viscosity or gelation, which cannot be obtained by the composition containing phosphoric acid or condensed phosphoric acid previously found by the present inventors. This is also the advantage not found in the commercially available two-package type paints. When the present coating composition is applied on articles to be coated upon the evaporation of solvent by drying, crosslinking reaction proceeds quite rapidly even at an ambient temperature, readily forming a film insoluble in organic solvents and with good physical properties. The cross-linked film has a good adhesion to metal, wood and plastics and also has a good protective effect thereon. The conventional corrosion resistant pigments, such as molybdate or phosphate, estender pigments, coloring pigments, and so on, can be used with the present coating composition, if necessary, thereby much improving the corrosion resistance, adhesion and so on, and also ensuring a satisfactory corrosion resistance for a prolonged period of time.

The ethylenic copolymers having pendant epoxy groups, one of constituents of the present coating composition, are copolymers comprised of (a) glycidyl acrylate or methacrylate, or allylglycidyl ether and (b) at least one of other polymerizable monomers. The copolymers may be the ordinary random copolymers, block copolymers or graft copolymers, which may be used alone or in mixture thereof.

Said polymerizable monomers (b) include acrylic acid or methacrylic acid esters represented by the following general formula:

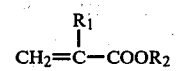

wherein $R_1$ is a hydrogen atom or an alkyl group having 1 to 3 carbon atoms, and $R_2$ an alkyl group or substituted alkyl group having 1 to 16 carbon atoms; styrene or its derivatives; vinyl acetate, acryl amide, methacryl amide, acrylonitrile, methacrylonitrile, etc.; other vinyl monomers copolymerizable with the monomer (a). In the preparation of the copolymers used in the present invention, it is necessary that the monomer (a) should be in a range of 2 to 60% by weight, preferably 5 to 30% by weight, on the basis of the total monomers.

Copolymerization of the monomer (a) with the monomer (b) is carried out in the presence of a well known free radical polymerization initiator according to the per se known method, such as a solution polymerization, a bulk polymerization method, and so on. In the present invention, the copolymers are used in solution in an organic solvent, and thus the copolymers obtained acording to other polymerization methods than the solution polymerization method can be used after dissolved in a specific organic solvent.

Acid phosphate esters or acid phosphite esters, another constituent for the present coating composition, is added to the composition in a range of 0.1 to 3.0 equivalents per one equivalent of the epoxy groups of the ethylenic copolymers. The acid phosphate esters or acid phosphite ester may be used in solution of ordinary alcohol. It seems that the acid phosphate esters or acid phosphite esters of the present coating composition takes part in ring opening and crosslinking reactions of epoxy groups. If its amount is less than 0.1 equivalent in the present coating composition, satisfactory resistances to solvent and hot water cannot be obtained, whereas when its amount is more than 3 equivalents, a film having poor adhesion and hardness is unpreferably formed.

The acid phosphate esters or acid phosphite ester used in the present coating composition is at least one of acid phosphate esters or acid phosphite esters represented by the following formulae:

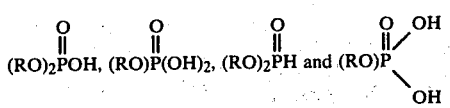

wherein R is an alkyl group having 3 to 18 carbon atoms, or an aryl group, or a substituted aryl group, methacryloyl or acryloyl group, $-C_{22}H_4Cl$,

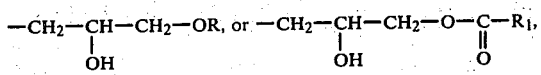

(wherein $R_1$ is an alkyl group having 1 to 15 carbon atoms or aryl group), and condensed phosphoric acid ester, and includes isopropyl acid phosphate, butyl acid phosphate, octyl acid phosphate, cresyl acid phosphate, isopropyl acid phosphite, butyl acid phosphite, mono-, di-, and triethyl pyrophosphates, mono-, di- and tributyl pyprophosphates, β-chloro-ethyl acid phosphate, bis(2-hydroxy ethyl methacrylate) acid phosphate, isodecyl acid phosphate, nonyl phenyl acid phosphate, di-lauryl hydrogen phosphite, di-phenyl hydrogen phosphite, etc.

Alcoholic solvent, further constituent for the present coating composition, is at least one of alcohols having 1 to 6 carbon atoms or ethyleneglycol monoalkyl ethers.

The alcoholic solvent can be used alone, but usually in a mixture of said alcohols or ethyleneglycol monoalkyl ethers with other organic solvents, when a solubility, and an affinity of the copolymers are taken into account. The other organic solvent is one or a combination of two or more of the ordinary organic solvents, such as aromatic hydrocarbons such as toluene or xylene; ketones such as methylethylketone or methylisobutylketone; aliphatic or alicyclic hydrocarbons such as normal hexane, cyclohexane, methylcyclohexane, ethylcyclohexane, etc.; esters such as ethyl acetate or butyl acetate. The amount of the alcoholic solvent is at least 5% by weight, on the basis of total solvent, in the ultimate composition of mixed two solutions.

The present coating composition is used as two-package type. The copolymer solution and the organic solvent solution containing acid phosphate ester or acid phosphite ester and the alcoholic solvent are mixed together prior to its application. If necessary, the resulting mixed solution is further diluted with a thinner, and used in coating. If the amount of the alcoholic solvent is less than 5% by weight on the basis of the total solvents, a film having considerably poor physical properties will be obtained, and the pot life of the mixed solution is shortened and a phenomenon of increasing viscosity is observed during the application working.

In the present coating composition, the ethylenic copolymers can be used alone or in mixture with other modifying resin. The modifying resin is one or a combination of two or more of nitrocellulose, cellulose acetate-butylate resin, vinyl chloride-vinyl acetate copolymer, vinyl acetate-ethylene copolymer, and so on. In that case, less than 50% by weight, particularly less than 30% by weight, of the modifying resin, on the basis of the ethylenic copolymers, can be used, as desired.

The concentration of non-volatile matter in the present coating composition depends upon coating methods, and cannot be specified, but the present coating composition is used at 10 to 40% by weight, particularly 15 to 30% by weight.

The present coating composition can be applied to articles to be coated by air spray, roller coating, electrostatic coating, dip coating, and other various means of coating.

The present coating composition can form a film of good physical properties through cross-linking curing with evaporation of the solvent when left at ambient temperatures after the application, and in that case, it is not objectionable to dry the applied article by heating to shorten the evaporation of the solvent.

The present invention will be described in detail below, referring to Examples and Comparative Example, where "part" is by weight.

EXAMPLE AND COMPARATIVE EXAMPLE

(1) Synthesis of copolymers containing glycidyl methacrylate

65 Parts of toluene was charged into an ordinary polymerization reactor attached with a stirrer, a reflux condenser, a thermometer, etc. after the air in the reactor was swept with nitrogen gas, heated to reflux with stirring. Then, a liquid mixture of 55 parts of methyl methacrylate, 30 parts of n-butyl methacrylate, 15 parts of glycidyl methacrylate, and 0.6 parts of Perbutyl I as an initiator (tert-butylperoxyisopropyl carbonate made by Nihon Yushi K.K., Japan) and 0.3 parts of azobisisobutyronitrile was added thereto dropwise by a metering pump over a period of 3 hours to proceed with polymerization reaction. After the addition of monomer mixture, the resulting mixture was further stirred for 3 hours under reflux to complete polymerization.

A resin solution having 60% by weight of non-volatile matters and an epoxy value of 0.063 was obtained with 98% conversion.

Then, 25 parts of tolune was added to 75 parts of the resin solution to prepare a solution A-I having 45% by weight of the non-volatile. Likewise, 25 parts of isporopanol was added to 75 parts of the resin solution to prepare a solution A-II.

(2) Preparation of acid phosphate ester or acid phosphite ester solution

38 Parts of octyl acid phosphate was mixed with 62 parts of isopropanol to prepare solution B-I.

Similarly, 38 parts of octyl acid phosphate was mixed with 62 parts of ethyl acetate to prepare a solution B-II.

(3) Preparation of varnish for coating

Varnishes (I) and (II), within the scope of the present invention and a varnish (III) outside the scope of the present invention were prepared by changing combinations of solutions A and solutions B on the basis of alcohol content of the total solvents of varnishes prepared in the following manner.

(I) 80 Parts of solution A-I was mixed with 20 parts of solution B-I, and further with 100 parts of a mixed solvent having a mixing ratio of toluene/n-butanol/ethyl acetate/acetate cellosolve of 6/2/1/1 as a thinner to prepare a varnish having 21% by weight of alcohol content in total solvents, 22% by weight of non-volatile matters, and a viscosity of 15 seconds by Ford cup No. 4.

(II) 80 Parts of solution A-II was mixed with 20 parts of solution B-II, and further with 100 parts of the mixed solvent having a mixing ratio of isobutanol/methylcellosolve/butycellosolve of 4/4/2 as a thinner to prepare a varnish having 74% by weight of alcohol content in total solvents, 22% by weight of non-volatile matters, and a viscosity of 15 seconds by Ford cup No. 4.

(III) 80 Parts of a solution A-I was mixed with 20 parts of solution B-II, and further with 100 parts of a mixed solvent having a mixing ratio of toluene/butyl acetate/ethyl acetate/acetate cellosolve of 6/2/1/1 as a thinner to prepare a varnish free from alcohol with 22% by weight of non-volatile matters, and a viscosity of 15 seconds by Ford cup No. 4.

(IV) 80 Parts of solution A-I mixed with 20 parts of solution consisting of 3 parts of 85% orthophosphoric acid and 17 parts of isopropanol, and further with 100 parts of a mixed solvent having a mixing ratio of toluene/n-butanol/ethyl acetate/acetate cellosolve of 6/2/1/1 as a thinner to prepare a varnish having an alcohol content of 23% by weight; 19% by weight of nonvolatile matters, and a viscosity of 15 seconds by Ford cup No. 4.

(4) Comparison of physical properties of coating film

The solutions (I), (II) and (III) were mixed in ultimate single solutions, and immediately applied onto ABS resin plates by spraying, and dried in the air at 20°C. and 65% RH. The dried coating films were left standing for 7 days, and then physical properties of the coating films were determined. The results are given in Table 1. Also, pot life at 25°C. of the ultimate solutions as mixed were tested, and the results are given in Table 2.

TABLE 2

| | Pot life at 25° C. of coating compositon | | | |
|---|---|---|---|---|
| | Present Invention | | Comparative Example | |
| | Varnish No. | | | |
| Pot life | (I) | (II) | (III) | (IV) |
| 1 hr | good | good | good | good |
| 2 hr | good | good | poor (becomes sticky) | good |
| 8 hr | good | good | | poor (becomes sticky) |
| 1 day | good | good | | |
| 3 days | good | good | | |
| 7 days | poor (becomes sticky) | | | |

Test procedures for physical properties of film (1) Film thickness: According to Erichsen paint inspection gage P.I.G Model 455.
(2) Pencil hardness: According to JIS K 5400.
(3) Impact resistance: According to JIS K 5400 B.
(4) Cross-cut test: According to JIS K 5400.
(5) Scratch test: Test was carried out by a drawing tester, and results were evaluated in comparison with standard picture prepared by Japan Paint Inspection Association.
(6) Solvent resistance: A solvent was dropped onto the coating film, and wiped away by a cotton gauze one minute thereafter to inspect a change in the appearance of the coating film.
(7) Alkali resistance: The coated form was dipped in an aqueous 5% caustic soda solution for 4 hours, to inspect a change in the appearance of the coating film.
(8) Acid resistance: The coated plate was dipped in an aqueous 5% sulfuric acid solution 24 hours to inspect a change in the appearance of the coating film.
(9) Water resistance: The coated plate was dipped in tap water at room temperature for 7 days to inspect a change in the appearance of the coating film.
(10) Lukewarm water resistance: The coated plate was dipped in water at 50°C for 7 days to inspect a change in the appearance of the coating film.

TABLE 1

| | Physical properties of coating films | | | |
|---|---|---|---|---|
| | Present Invention | | Comparative Example | |
| | Varnish No. | | | |
| Test item | (I) | (II) | (III) | (IV) |
| Film thickness (μm) | 35–45 | 30–40 | 32–38 | 33–40 |
| Pencil hardness (Mitsubishi uni) | H | H | F | F |
| Impact resistance (½" g-cm) | 500–20 over | 500–20 over | 500–10 | 500–10 |
| Cross-cut test | 100/100 | 100/100 | 50/100 | 100/100 |
| Scratch test | 10 | 10 | 8 | 10 |
| Solvent resistance | | | | |
| Gasoline spot test | ○ | ○ | Δ | Δ |
| Ethanol spot test | ◎ | ◎ | ○ | ○ |
| Alkali resistance (24 hours) | ◎ | ◎ | Δ | Δ |
| Acid resistance (24 hours) | ◎ | ◎ | ◎ | ◎ |
| Water resistance (7 days) | ◎ | ◎ | ○ | x |
| Lukewarm water resistance (7 days) | ◎ | ◎ | Δ | x |
| Boiling water resistance (one hour) | ◎ | ◎ | x | x |
| Humidity resistance (7 days) | ◎ | ◎ | x | x |

Remarks:
◎ excellent
○ Good
Δ fair
x poor

What is claimed is:

1. An ambient temperature curing coating composition which consist essentially of a solution of (1) components reactive with each other to form a film upon curing at ambient temperature and (2) a solvent; said film-forming components (1) being:
   (a) copolymers having pendant epoxy groups prepared by copolymerization of 2 to 60% by weight, on the basis of total monomer, of glycidyl acrylate or methacrylate or allylglycidyl ether with at least one other polymerizable monomer, and
   (b) 0.1 to 3.0 equivalents of at least one of acid phosphate ester and acid phosphite ester represented by the following formula, per one equivalent of the epoxy groups of the copolymers,

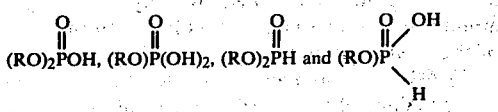

[R is an alkyl group having 3 to 18 carbon atoms, or an aryl group, or substituted aryl group, methacryloyl or acryloyl, —$C_2H_4Cl$,

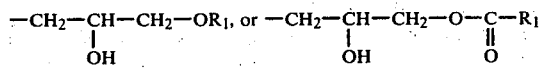

($R_1$ is an alkyl group having 1 to 15 carbon atoms, or aryl group)] and, said solvent (2) being:
   (c) at least 5% by weight, on the basis of the solvent (2), of an alcoholic solvent, and
   (d) at least one other organic solvent.

2. An ambient temperature-curing coating composition according to claim 1, wherein the acid phosphate ester or acid phosphite ester is isopropyl acid phosphate, butyl acid phosphate, octyl acid phosphate, cresyl acid phosphate, ethyl acid phosphite, butyl acid phosphite, mono-, di-, and triethyl pyrophosphite, or mono-, di- and tributyl pyrophosphite, β-chloro-ethyl acid phosphate, bis (2-hydroxyethyl methacrylate) acid phosphate, isodecyl acid phosphate, nonyl phenyl acid phosphate, di-lauryl hydrogen phosphite, di-phenyl hydrogen phosphite.

3. An ambient temperature-curing coating composition according to claim 1, wherein the alcoholic solvent is an alcohol having 1 to 6 carbon atoms or ethylene glycol monoalkyl ether.

4. An ambient temperature-curing coating composition according to claim 1, wherein the ethylenic copolymer is used in mixture of not more than 50% by weight, on the basis of the ethylenic copolymer, of modifying resin.

5. An ambient temperature-curing coating composition according to claim 1, wherein the modifying resin is nitrocellulose, cellulose acetate-butyrate resin, vinyl chloride-vinyl acetate copolymer, or vinyl acetate-ethylene copolymer.

* * * * *